United States Patent
Hanya et al.

(10) Patent No.: US 7,649,716 B2
(45) Date of Patent: Jan. 19, 2010

(54) HEAD SUSPENSION WITH ARM HAVING FLEXURE AND RESILIENT SUPPORT ON OPPOSING SIDES

(75) Inventors: Masao Hanya, Aikoh-gun (JP); Eiji Watadani, Aikoh-gun (JP); Ichiro Takadera, Aikoh-gun (JP)

(73) Assignee: NHK Spring Co., Ltd., Yokohama (JP)

( * ) Notice: Subject to any disclaimer, the term of this patent is extended or adjusted under 35 U.S.C. 154(b) by 386 days.

(21) Appl. No.: 11/505,219

(22) Filed: Aug. 14, 2006

(65) Prior Publication Data

US 2007/0041130 A1 Feb. 22, 2007

(30) Foreign Application Priority Data

Aug. 17, 2005 (JP) .............................. 2005-236440

(51) Int. Cl.
 *G11B 5/48* (2006.01)
 *G11B 21/16* (2006.01)
(52) U.S. Cl. ............... 360/245.4; 360/244.9; 360/245.9
(58) Field of Classification Search .............. 360/244.2, 360/244.5, 244.8, 245.9, 245.8, 265.9, 264.2, 360/245.4, 244.9
See application file for complete search history.

(56) References Cited

U.S. PATENT DOCUMENTS

| | | | |
|---|---|---|---|
| 5,892,637 A | 4/1999 | Brooks, Jr. et al. | |
| 6,057,986 A * | 5/2000 | Takasugi | 360/245.9 |
| 6,765,759 B2 | 7/2004 | Bhattacharya et al. | |
| 6,798,618 B2 | 9/2004 | Takagi et al. | |
| 7,088,558 B2 * | 8/2006 | Takagi et al. | 360/265.9 |
| 7,365,945 B2 * | 4/2008 | Fujimoto et al. | 360/255 |
| 2003/0179501 A1 * | 9/2003 | Takagi et al. | 360/245 |
| 2006/0221503 A1 | 10/2006 | Watadani et al. | |
| 2006/0221504 A1 | 10/2006 | Hanya et al. | |

FOREIGN PATENT DOCUMENTS

| | | |
|---|---|---|
| JP | 63-58372 | 4/1988 |
| JP | 9-282624 | 10/1997 |
| JP | 11-514780 | 12/1999 |
| JP | 2002-203383 | 7/2002 |
| JP | 2005-166203 | 6/2005 |

* cited by examiner

*Primary Examiner*—Craig A Renner
*Assistant Examiner*—Gustavo Polo
(74) *Attorney, Agent, or Firm*—Jordan and Hamburg LLP

(57) ABSTRACT

A head suspension for a hard disk drive has an arm to be attached to a carriage of the hard disk drive and turned around a spindle, a load beam including a rigid part and a resilient part, to apply load onto a head that is arranged at a tip end thereof to write and read data to and from a disk arranged in the hard disk drive, a base end of the rigid part supported on the arm side through the resilient part, and a flexure having read/write wiring patterns connected to the head, the flexure supporting the head and attached to a disk side face of the rigid part, the resilient part at least separated from the arm side and fixed to an opposite disk side face on the arm side and the flexure fixed to a disk side face on the arm side.

20 Claims, 5 Drawing Sheets

HEAD SUSPENSION WITH ARM HAVING FLEXURE AND RESILIENT SUPPORT ON OPPOSING SIDES

BACKGROUND OF THE INVENTION

1. Field of the Invention

The present invention relates to a head suspension for a hard disk drive (HDD) incorporated in an information processing apparatus such as computer.

2. Description of the Related Art

FIG. 8 is a perspective view showing a head suspension according to a related art arranged in a hard disk drive. The head suspension 101 comprises an arm 103 serving as a base plate and a load beam 105, and a flexure 107 is supported thereon. The load beam 105 includes a rigid part 109 and a resilient part 111. The resilient part 111 is composed of a resilient member 113 separated from and disposed between the rigid part 109 and the arm 103. The resilient member 113 is fixed to disk side faces of the arm 103 and the rigid part 109. The flexure 107 leads from the rigid part 109 to the arm 103 while the flexure 107 overlaps the resilient member 113. A head 115 to write and read data to and from a disk is provided at the tip end of the load beam 105.

The arm 103 is attached to a carriage of the hard disk drive, and is turned around a spindle by a positioning motor such as voice coir motor. By turning the arm 103 around the spindle, the head 115 for the head suspension 101 moves to a target track of a disk.

When the disk is rotated at high speed, the head 115 slightly floats from the disk against a gram load that is a load applied to the head 115 by the head suspension 101.

In recent years, portable music players and the like employ one-inch hard disk drives. In this way, the application of one-inch hard disk drive has grown. Further, almost all the hard disk drive manufacturers develop small-sized hard disk drives such as 0.85-inch or 1-inch hard disk drives in progress in consideration of their employment to portable phones.

Such small-sized hard disk drives such as those for portable phones are naturally required improvements in each performance such as environment resistance, impact resistance or power saving, and are required to be thinner in the thickness than the portable music players.

However, in the structure as shown in FIG. 8, a thickness of the resilient member 113 and a thickness of the flexure 107 are sequentially laminated on the disk side face of the arm 103. Accordingly, there is a limit in reducing the laminated dimension of the disk side face of the head suspension 101, and therefore, it prevents the hard disk drive from thinning.

The related art mentioned above is disclosed in Japanese Unexamined Patent Application Publication No. 2002-203383.

SUMMARY OF THE INVENTION

An object of the present invention is to solve the problem that there is a limit in reducing a laminated dimension of a disk side face of a head suspension, to prevent a hard disk drive from thinning.

In order to accomplish the object, an aspect of the present invention is most characterized in that a resilient part is fixed to an opposite disk side face and a flexure is fixed to the disk side face on the arm side.

According to this aspect of the present invention, the head suspension has a load beam including a rigid part, a resilient part and a flexure supporting a head. The resilient part is fixed to the opposite disk side face and the flexure is fixed to the disk side face on the arm side. Accordingly, the thickness of the resilient part does not influence the laminated dimension of the disk side face, which can contribute to the thinning of the hard disk drive.

DETAILED DESCRIPTION OF EMBODIMENTS

Head suspensions according to embodiments of the present invention will be explained in detail. Each embodiment has a novelty in the arrangement of a resilient part and a flexure on an arm side, to solve the problem to restrict the laminated dimension of the head suspension.

Figure 1:
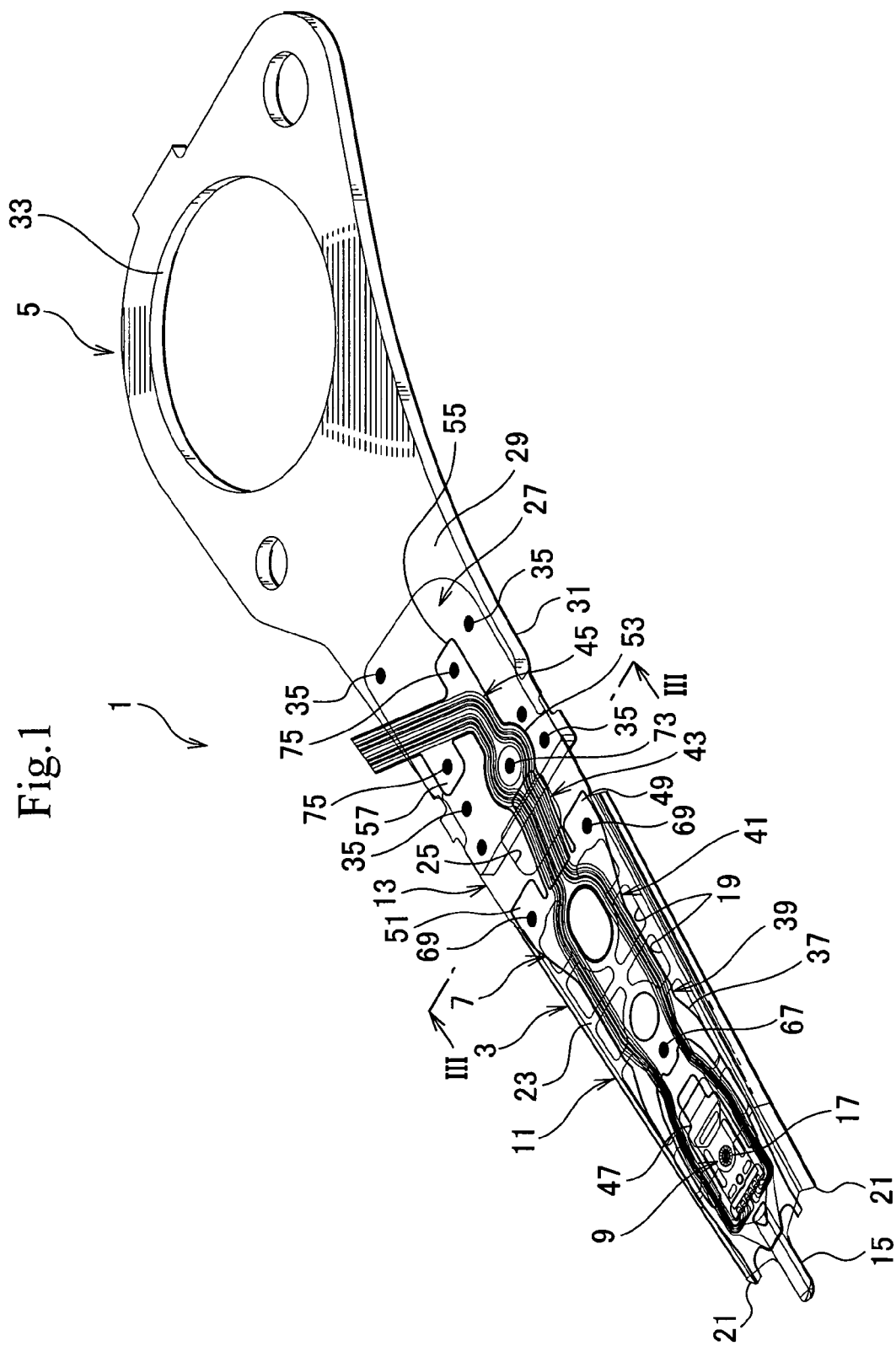
FIG. 1 is a perspective view showing a head suspension according to a first embodiment of the present invention with a flexure seen through a load beam.
Figure 2:
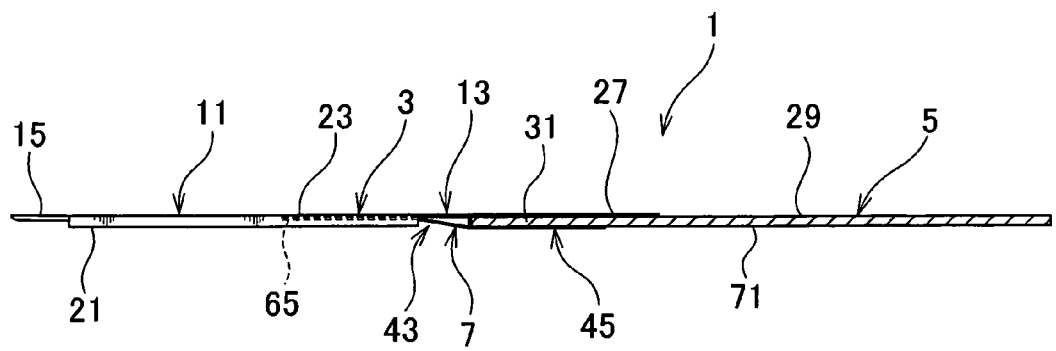
FIG. 2 is a partly sectional side view showing the head suspension of FIG. 1.
Figure 3:
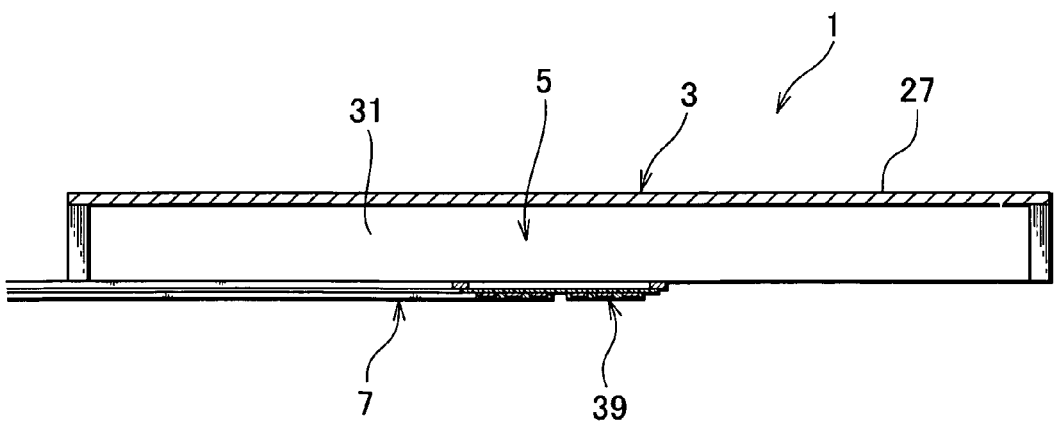
FIG. 3 is a sectional view taken along a line III-III of FIG. 1.
Figure 4:
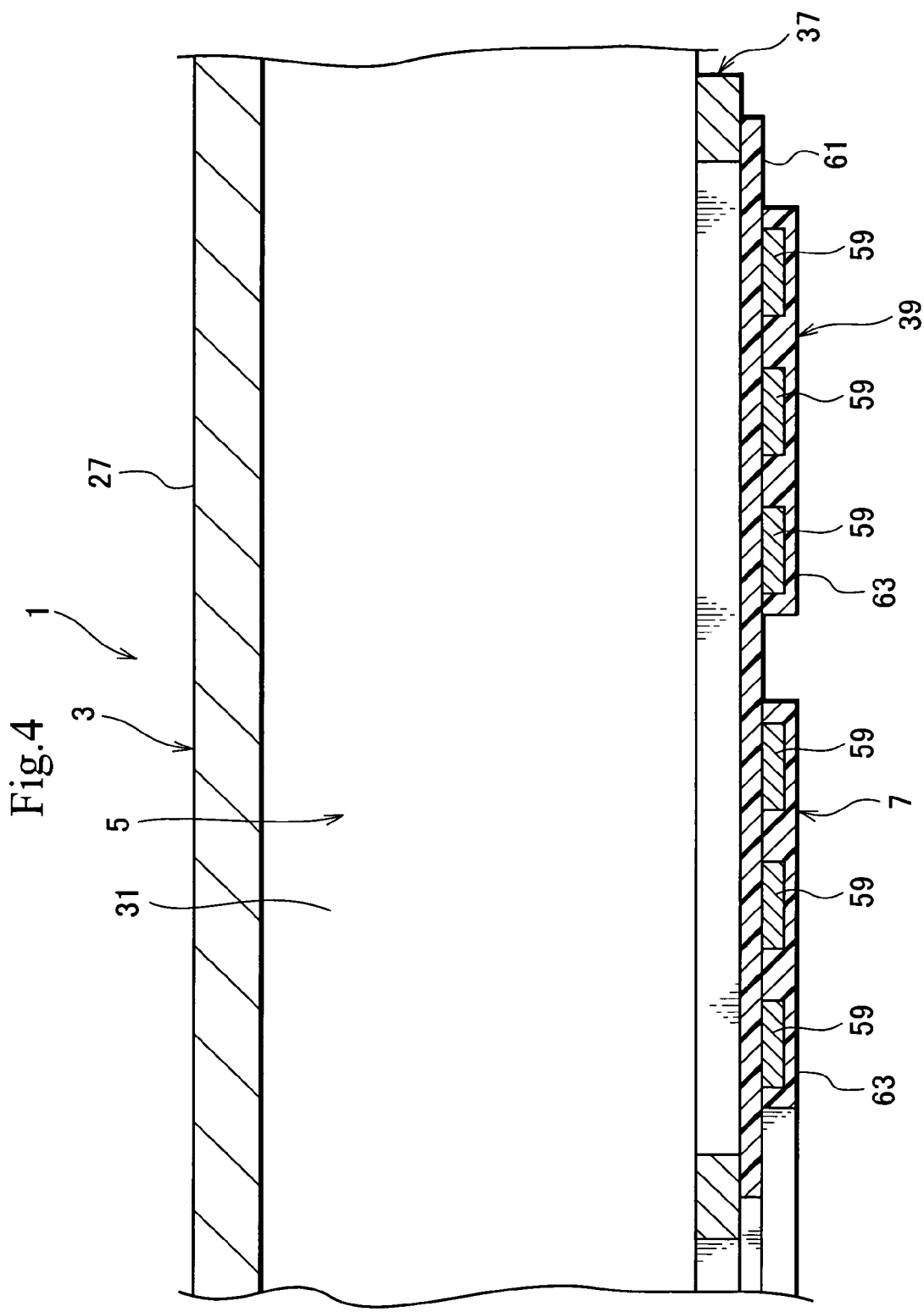
FIG. 4 is an enlarged sectional view showing a part of FIG. 3.
Figure 5:
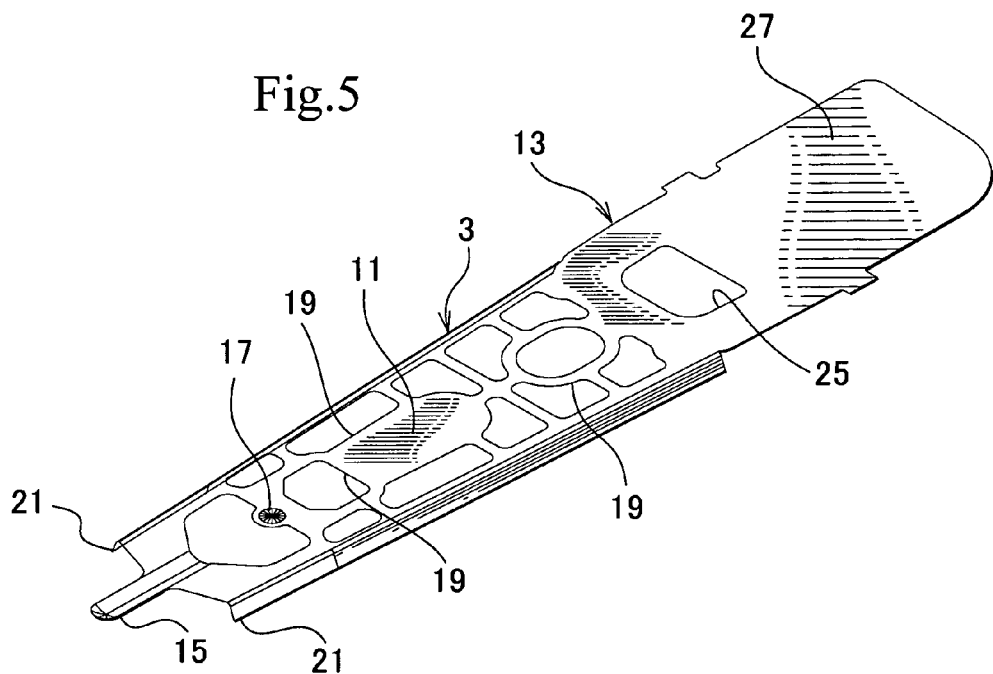
FIG. 5 is a perspective view showing a load beam of the head suspension of FIG. 1.
Figure 6:
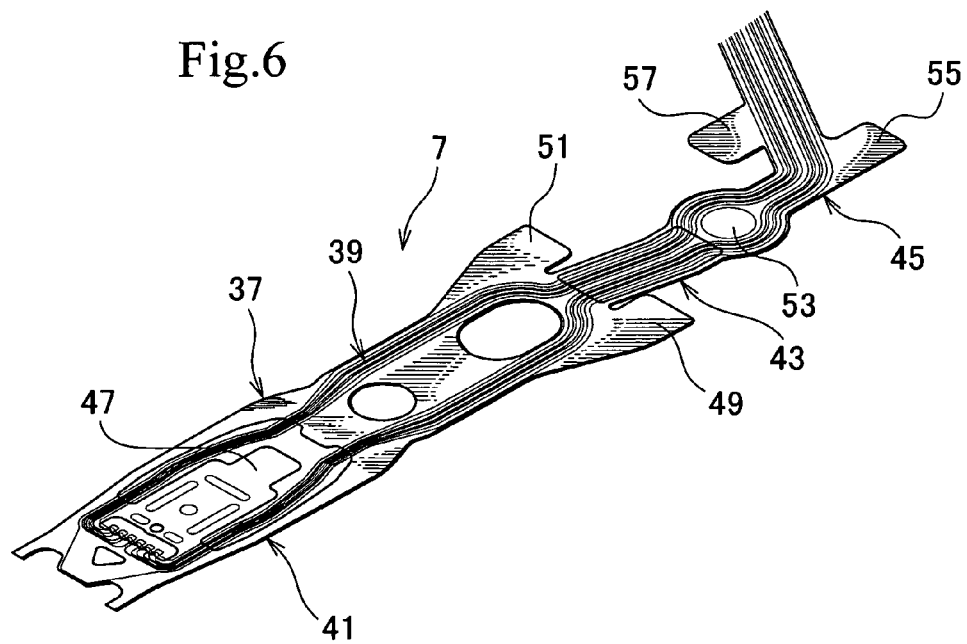
FIG. 6 is a perspective view showing a flexure of the head suspension of FIG. 1.

A head suspension according to the first embodiment of the present invention will be explained with reference to FIGS. 1 to 6 in which FIG. 1 is a perspective view showing the head suspension with a flexure seen through a load beam, FIG. 2 is a partly sectioned side view showing the head suspension of FIG. 1, FIG. 3 is a sectional view taken along a line III-III of FIG. 1, FIG. 4 is an enlarged sectional view showing a part of FIG. 3, FIG. 5 is a perspective view showing the load beam of FIG. 1 and FIG. 6 is a perspective view showing the flexure of FIG. 1.

The head suspension 1 shown in FIGS. 1 to 4 is used for a small-sized hard disk drive such as a 0.85-inch or 1-inch hard disk drive. The head suspension 1 comprises a load beam 3, an arm 5 and a flexure 7.

The load beam 3 is made of, for example, nonmagnetic SUS 304 (Japanese Industrial Standard) stainless steel and has a thickness is set at about $t_L$=30 μm. The load beam 3 applies load (gram load) onto a head 9 that writes and reads data to and from a disk. In this specification, the "disk" is a storage medium which is arranged in a hard disk drive and to and from which data is written and read through the head suspension. The load beam 3 includes a rigid part 11 and a resilient part 13.

As shown in FIGS. 1 to 5, the rigid part 11 is extended from the tip end to the base end thereof and is formed to be entirely fine from the tip end to the base end. The rigid part 11 has a load/unload tab 15 at a tip end thereof. In the vicinity of the tip end, the rigid part 11 has a dimple 17 having a height of about $t_{DH}$=50 μm. The rigid part 11 is provided with a plurality of penetrating portions 19 such as holes to be reduced in weight. Each side edge in an across-the-width direction of the rigid part 11 has an enforcing rail 21 that is formed by raising and box-bending the side edge toward the disk in the thickness direction. The rail 21 is extended entirely from the tip end immediately to the resilient part 13 along both edges of the rigid part 11. The height of the rail 21 is set at about hs=200 μm from an opposite disk side face 23 of the rigid part 11. The rail 21 may be appropriately omitted.

The resilient part 13 is integrally formed with the rigid part 11 and is extended from the rigid part 11 to the arm 5. The thickness of the resilient part 13 is set at about ts=30 μm as in the rigid part 11 according to the present embodiment. The resilient part 13 is provided with a window 25 such as a hole, and is integrally provided with a joint portion 27 at an end thereof. The joint portion 27 is extended from the resilient part 13 to an opposite disk side face 29 of the arm 5. In this specification, the "opposite disk side face" is a surface of the rigid part 11 that is oriented opposite to the disk. In other words, the opposite disk side face 29 is opposite to a disk side face 65 of rigid part 11 facing to the disk.

As shown in FIGS. 1 to 4, the arm 5 integrally comprises a base plate 31 as a base in the present embodiment, and the base plate 31 constitutes the arm. The base plate 31 may be formed separately from the arm 5, and may be attached to the arm 5 by swaging or the like to be constituted as the arm 5. The thickness of the arm 5 is set at about $t_A$=150 μm. The arm 5 has an attachment hole 33 to be attached to the carriage of the hard disk drive so that the arm 5 is turned around a spindle.

The resilient part 13 is fixed to the base plate 31 such that the joint portion 27 of the resilient part 13 is fixed to the opposite disk side face 29 of the base plate 31 of the arm 5. This fixing is performed by a plurality of weld spots 35 formed by laser welding or the like. Namely, the base end of the rigid part 11 is supported to the base plate 31 constituting the arm 5, i.e., on the arm 5 side through the resilient part 13.

As shown in FIGS. 1 to 4 and 6, the flexure 7 extends along the load beam 5 to the arm 5, includes a base layer 37 and wiring patterns 39, and supports the head 9. The wiring patterns 39 are connected to the head 9 to write and read data to and from the disk.

The base layer 37 is a conductive thin plate made of resilient stainless steel (SUS) having the thickness of about $t_F$=20 82 m. The base layer 37 has a rigid part area 41, a resilient part area 43 and an arm area 45, which are continuously formed. The rigid part area 41, the resilient part area 43 and the arm area 45 correspond to the rigid part 11, resilient part 13 and arm 5, respectively. The rigid part area 41 is formed to be wide and is provided with a tongue 47 in the vicinity of the tip end thereof. At the head 9, the tongue 47 supports a slider having the height of about $t_S$=230 μm. The rigid part area 41 has a pair of fixing tongues 49 and 51 on both side edges in the across-the-width direction thereof. The tongues 49 and 51 protrude from the side edges in the across-the-width direction and extend toward the resilient part 13 in a longitudinal direction of the rigid part area 41. The resilient part area 43 and the arm area 45 are formed to be narrow, and the arm area 45 includes a fixing circle portion 53 and fixing tongue portions 55 and 57.

Ends of the wiring patterns 39 are electrically connected to write and read terminals arranged on the slider of the head 9, and the other ends of the wiring patterns 39 are connected to terminals arranged on a terminal support on the arm 5 side.

As shown in FIGS. 3 and 4, the wiring patterns 39 are made of conductors 59. The conductors 59 are arranged on an insulating layer 61 made of, for example, polyimide resin on the base layer 37. The conductors 59 are covered with a protective insulating cover 63 made of, for example, polyimide resin. The thicknesses of the base layer 37, the insulating layer 61, the conductors 59 and the insulating cover 63 are set at about $t_{BL}$=20 μm, $t_1$=10 μm, tc=10 μm and $t_{IC}$=5 μm, respectively.

As shown in FIGS. 1 to 4, the flexure 7 is fixed to the disk side face 65 of the rigid part 11 by weld spots 67 and 69 made by laser welding or the like at the rigid part area 41 such that the wiring patterns 39 are oriented toward the disk.

The resilient part area 43 is arranged to pass through an area overlaid by the window 25 of the resilient part 13, so that the resilient part area 43, toward the arm 5, is gradually separated away from the resilient part 13 as viewed from the side as in FIG. 2.

The arm area 45 is arranged on a disk side face 71 of the arm 5, and is fixed to the arm 5 at the fixing circle portion 53 and the fixing tongues 55 and 57 by weld spots 73 and 75 made by laser welding or the like.

Therefore, in the present embodiment, the resilient part 13 is fixed to the opposite disk side face 29 of the arm 5 and the flexure 7 is fixed on the disk side face 71 of the arm 5.

The head suspension 1 described above is constituted so that the arm 5 is supported to the carriage of the hard disk drive to be turned around the spindle by the positioning motor such as voice coil motor. By turning the arm 5 around the spindle, the head 9 for the head suspension 1 moves to a target track of the disk.

When the disk is rotated at high speed, the head 9 slightly floats from the disk against the gram load.

According to the present embodiment, the thickness of the resilient part 13 does not influence the laminated dimension of the disk side face 71 of the arm 5, thereby contributing to the thinning of the hard disk drive.

The resilient part 13 of the load beam 3 can employ a closed section structure as viewed from the side together with the resilient part area 43 of the flexure 7, thereby improving torsional rigidity.

A head suspension according to a second embodiment of the present invention will be explained with reference to FIG. 7.

Figure 7:
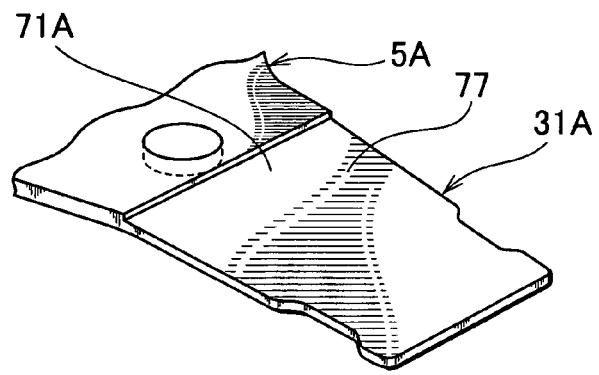
FIG. 7 is a perspective view partly showing an arm of a head suspension according to a second embodiment of the present invention.
Figure 8:
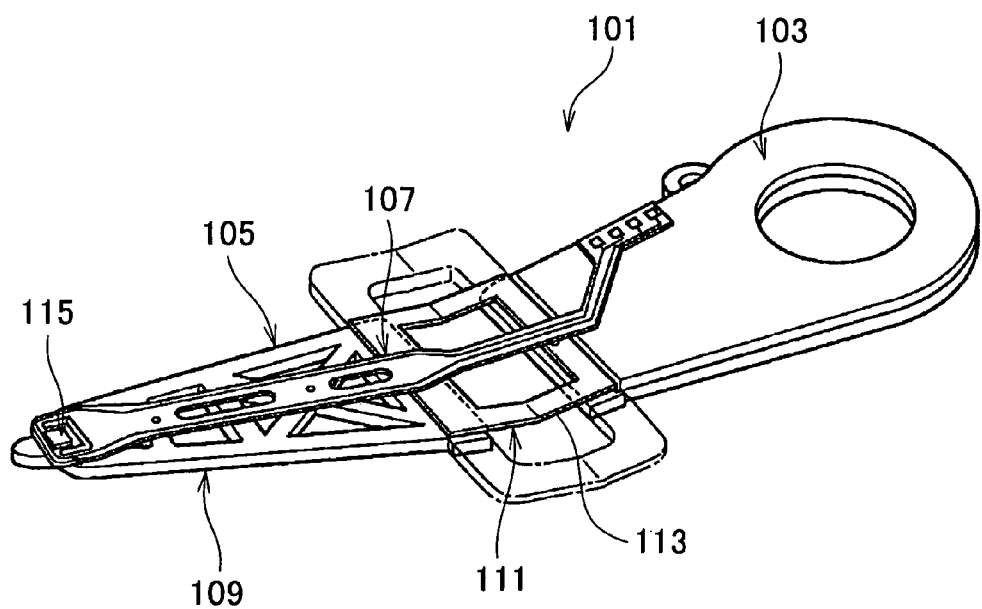
FIG. 8 is a perspective view showing a head suspension according to a related art.

FIG. 7 is a perspective view partly showing an arm of the head suspension according to the second embodiment of the present invention. The structure of the second embodiment is basically the same as that of the first embodiment, and therefore, the same or corresponding parts are represented with the same reference numerals or the same reference numerals plus "A."

As shown in FIG. 7, the head suspension according to the present embodiment is provided with a stepped face 77 for fixing the flexure at a disk side face 71A of a base plate 31A in an arm 5A. A sectional structure of the flexure is similar as in the first embodiment, where the wiring patterns are faced to the disk. The arm area of the flexure is fixed on the stepped face 77 in the same manner as the first embodiment.

Therefore, since the disk side face 71A of the arm 5A is provided with the stepped face 77 for fixing the flexure, the flexure can be prevented from projecting toward the disk side face 71A of the arm 5A while being fixed on the disk side face 71A of the arm 5A, thereby securely contributing to the thinning of the hard disk drive.

What is claimed is:

1. A head suspension for carrying a head over a disk in a hard disk drive and configured for attachment to a carriage of a spindle, comprising:
   an arm configured to be attached to the carriage of the hard disk drive and turned around a spindle, said arm including a base plate having a disk side face and an opposite disk side face;
   a load beam, including a rigid part and a resilient part, configured to apply load onto a head that is arranged at a tip end thereof to write and read data to and from the disk arranged in the hard disk drive;

the rigid part having a base end proximate the arm;
the resilient part having a first end and a second end, said first end being connected to the rigid part and the second end being a joint portion connected to the base plate of the arm so as to support the rigid part from the arm in a longitudinal direction by a series connection of the resilient part and the rigid part;
a flexure having read/write wiring patterns connected to the head, the flexure supporting the head and attached to a disk side face of the rigid part, the flexure extending along the load beam toward the arm and including a rigid part area disposed along and fixed to the disk side face of the rigid part, a resilient part area disposed along the resilient part, and an arm area disposed along the base plate; and
overlapping of the base plate by portions of the load beam and the flexure being limited to the resilient part having the joint portion fixed to the opposite disk side face on the base plate of the arm and the flexure having the arm area fixed to the disk side face on the base plate of the arm.

2. The head suspension of claim 1, further comprising an enforcing rail formed along each side edge of the rigid part in an across-the-width direction thereof by box-bending the side edge in a disk facing direction such that the rigid part area of the flexure including the read/write wiring patterns lies between the enforcing rails in the across-the-width direction, wherein the disk facing direction is defined by the flexure being configured to support the head on a disk facing side of the flexure facing in the disk facing direction, and the flexure having an opposite disk side face on a side opposing said disk facing side of the flexure and said opposite disk side face of the flexure is attached to said disk side face of the rigid part.

3. The head suspension of claim 1, wherein the resilient part is integrally formed with the rigid part.

4. The head suspension of claim 2, wherein the resilient part is integrally formed with the rigid part.

5. The head suspension of claim 1, wherein:
the base plate of the arm has a stepped face recessed into the disk side face of the arm, and
the flexure has the arm area thereof attached to the stepped face.

6. The head suspension of claim 2, wherein:
the base plate of the arm has a stepped face recessed into the disk side face of the arm, and
the flexure has the arm area thereof attached to the stepped face.

7. The head suspension of claim 3, wherein:
the base plate of the arm has a stepped face recessed into the disk side face of the arm, and
the flexure has the arm area thereof attached to the stepped face.

8. The head suspension of claim 4, wherein:
the base plate of the arm has a stepped face recessed into the disk side face of the arm, and
the flexure has the arm area thereof attached to the stepped face.

9. The head suspension of claim 1 wherein the resilient part, the resilient part area of the flexure, and the base plate of the arm in combination form a closed section structure by forming a triangular configuration formed of first, second and third legs when viewed from a direction parallel to a plane of the base plate and normal to the longitudinal direction of the load beam wherein the first leg is the resilient part connecting the base end of the rigid part to the base plate, a second leg is the resilient part area of the flexure, and a third leg is a side edge surface of the base plate facing in the longitudinal direction.

10. The head suspension of claim 9 wherein said flexure is fixed to the disk side face of the rigid part and the resilient part area of the flexure diverges away from a plane of the disk side face of the rigid part with increasing distance away from the base end of the rigid part so as to define an acute angle of the triangular configuration in combination with the resilient part.

11. The head suspension of claim 10, wherein the resilient part is integrally formed with the rigid part.

12. The head suspension of claim 11, wherein:
the base plate of the arm has a stepped face recessed into the disk side face of the arm, and
the flexure has the arm area thereof attached to the stepped face.

13. The head suspension of claim 10, wherein:
the base plate of the arm has a stepped face recessed into the disk side face of the arm, and
the flexure has the arm area thereof attached to the stepped face.

14. The head suspension of claim 9, wherein the resilient part is integrally formed with the rigid part.

15. The head suspension of claim 14, wherein:
the base plate of the arm has a stepped face recessed into the disk side face of the arm, and
the flexure has the arm area thereof attached to the stepped face.

16. The head suspension of claim 9, wherein:
the base plate of the arm has a stepped face recessed into the disk side face of the arm, and
the flexure has the arm area thereof attached to the stepped face.

17. The head suspension of claim 2 wherein the resilient part, the resilient part area of the flexure, and the base plate of the arm in combination form a closed section structure by forming a triangular configuration formed of first, second and third legs when viewed from a direction parallel to a plane of the base plate and normal to the longitudinal direction of the load beam wherein the first leg is the resilient part connecting the base end of the rigid part to the base plate, a second leg is the resilient part area of the flexure, and a third leg is a side edge surface of the base plate facing in the longitudinal direction.

18. The head suspension of claim 17 wherein said flexure is fixed to the disk side face of the rigid part and the resilient part area of the flexure diverges away from a plane of the disk side face of the rigid part with increasing distance away from the base end of the rigid part so as to define an acute angle of the triangular configuration in combination with the resilient part.

19. The head suspension of claim 18, wherein the resilient part is integrally formed with the rigid part.

20. The head suspension of claim 19, wherein:
the base plate of the arm has a stepped face recessed into the disk side face of the arm, and
the flexure has the arm area thereof attached to the stepped face.

* * * * *